United States Patent
Kollath et al.

(10) Patent No.: US 7,530,405 B2
(45) Date of Patent: May 12, 2009

(54) IMPLEMENT QUICK COUPLER LATCH MECHANISM

(75) Inventors: Michael Dean Kollath, Dunkerton, IA (US); Robert Lee Wood, Jr., Waterloo, IA (US); Edwin Roy Kreis, Waterloo, IA (US)

(73) Assignee: Deere & Company, Moline, IL (US)

( * ) Notice: Subject to any disclaimer, the term of this patent is extended or adjusted under 35 U.S.C. 154(b) by 461 days.

(21) Appl. No.: 11/222,621

(22) Filed: Sep. 9, 2005

(65) Prior Publication Data

US 2007/0056754 A1  Mar. 15, 2007

(51) Int. Cl.
*A01B 51/00* (2006.01)

(52) U.S. Cl. .................. 172/272; 172/439; 280/508

(58) Field of Classification Search ........... 172/272, 172/275, 439; 280/508, 509, 510, 460.1, 280/477, 504; 37/231; 414/703, 723
See application file for complete search history.

(56) References Cited

U.S. PATENT DOCUMENTS

| | | | | |
|---|---|---|---|---|
| 2,979,137 | A | | 4/1961 | Hess |
| 3,172,686 | A | * | 3/1965 | Beard .................. 172/272 |
| 3,531,140 | A | * | 9/1970 | Fadden et al. ............ 280/477 |
| 3,807,769 | A | * | 4/1974 | Thompson et al. ......... 172/272 |
| 3,829,128 | A | * | 8/1974 | Sutton .................. 172/272 |
| 4,108,464 | A | * | 8/1978 | von Allworden et al. .... 280/508 |
| 4,279,431 | A | * | 7/1981 | Schott ................. 280/508 |
| 4,415,175 | A | * | 11/1983 | Kainer .................. 172/272 |
| 4,549,744 | A | | 10/1985 | Herr et al. |
| 5,050,684 | A | * | 9/1991 | Vollmer ................ 172/272 |
| 5,244,047 | A | | 9/1993 | Eudy |
| 5,333,695 | A | | 8/1994 | Walter |
| 5,441,117 | A | | 8/1995 | Fartmann et al. |
| 5,497,835 | A | * | 3/1996 | Laubner et al. .......... 172/272 |
| 6,349,959 | B2 | * | 2/2002 | Schlegel et al. .......... 280/477 |
| 2003/0121675 | A1 | * | 7/2003 | Gingerich ............... 172/274 |

FOREIGN PATENT DOCUMENTS

GB  1 563 457  3/1980

* cited by examiner

*Primary Examiner*—Thomas B Will
*Assistant Examiner*—Jamie L McGowan

(57) ABSTRACT

A quick coupler has a frame with a hook, and an operator movable control bar. The hook has a recess for receiving a hitch pin. A latch mechanism includes a latch, a one-piece trigger, a spring, and a stop fixed to the coupler frame. The latch is pivotally coupled to the frame and moves to open and closed positions permitting and preventing the hitch pin to move into and out of the hook recess. The trigger is pivotally coupled only to the latch and to the control bar. The trigger engages the hitch pin and moves the latch to the open position. When the hitch pin is in the hook recess, the stop engages the trigger and prevents the latch from moving to its open position. A central portion of the trigger is pivotally coupled to a central portion of the latch. A shoulder surface is formed in a lower end of the latch, and a tab projects from an end of the trigger. The tab engages the shoulder surface to limit pivoting of the latch to its open position when the trigger engages the stop. A latch spring is mounted on the latch and engages the frame and urges the latch to its closed position.

2 Claims, 6 Drawing Sheets

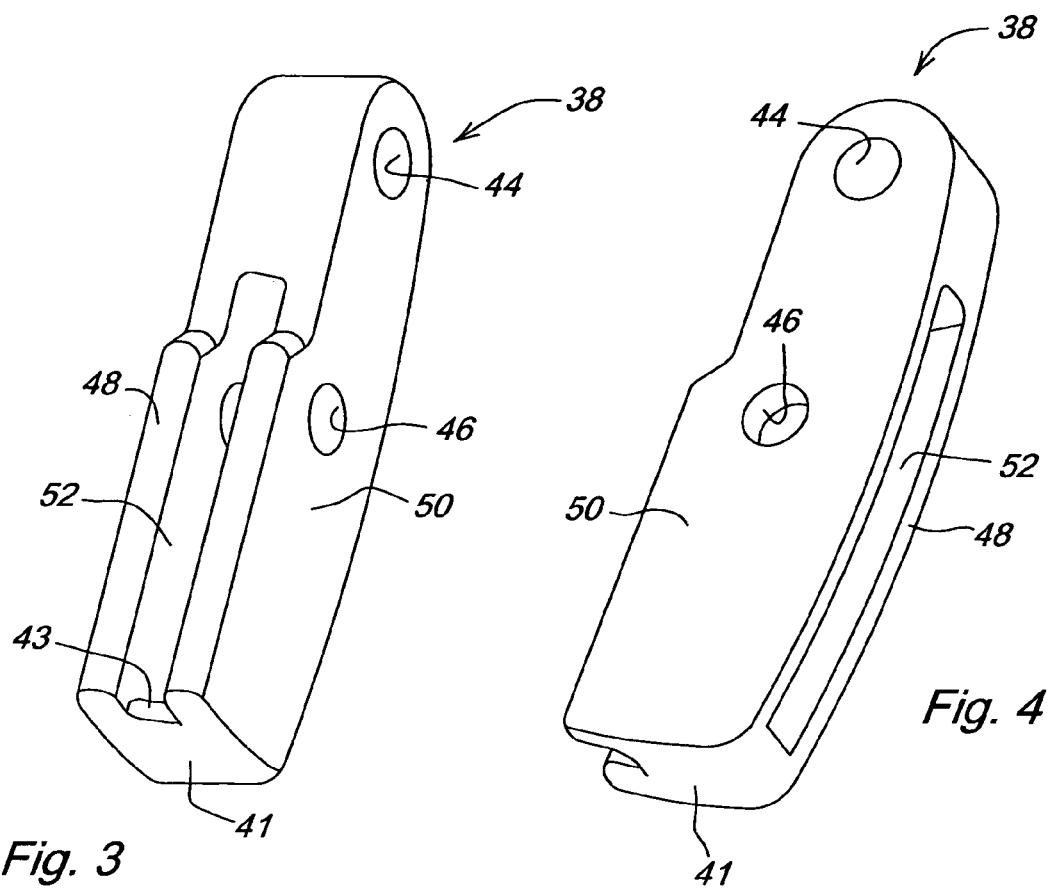
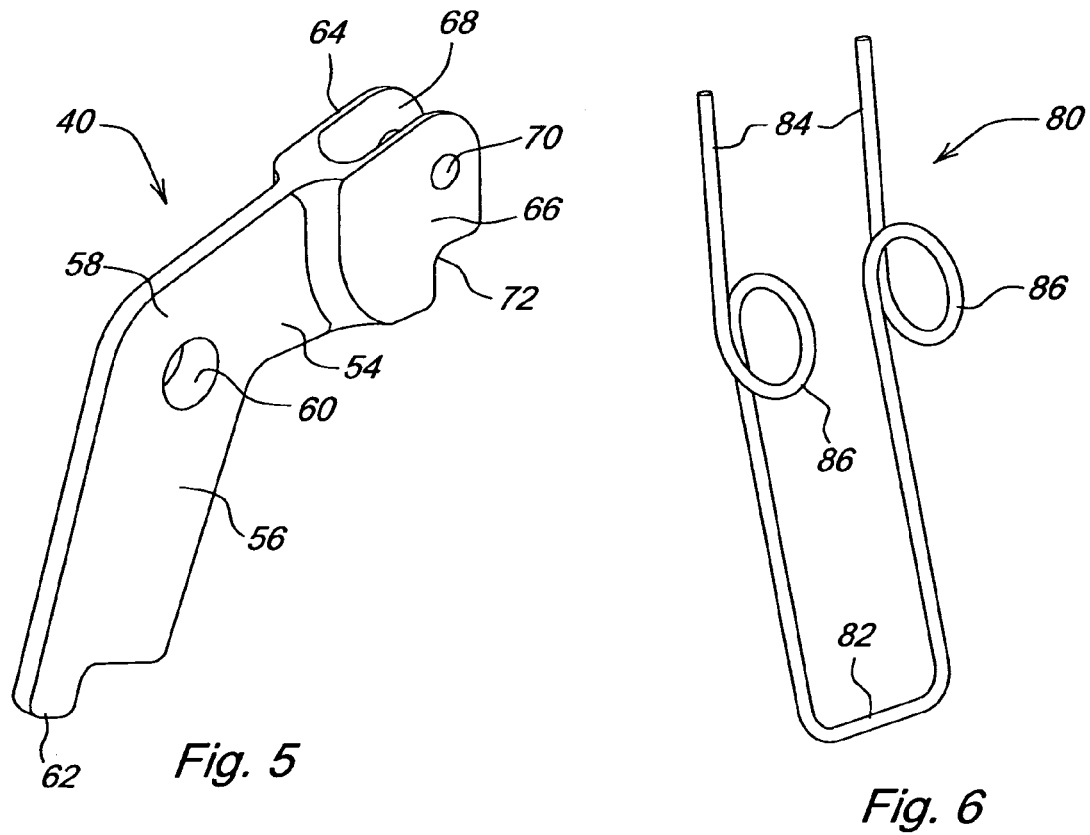

IMPLEMENT QUICK COUPLER LATCH MECHANISM

BACKGROUND

The present invention relates to an implement quick coupler latch mechanism.

Implement quick couplers are used to improve the ease of attaching an implement to the 3-point hitch of a tractor. Typically, such couplers have a U-frame with lower hooks and with latches which capture the implement pins in the lower hooks. The latches are connected via a linkage to a handle near the top of the coupler frame. The operator can manipulate the handles to open the latches to allow the implement to be detached from the quick coupler.

Most current quick couplers, including current production John Deere couplers include an L-shaped latch member. A spring on the linkage holds the linkage down, thus holding the latch in the closed position. This type of latch has an advantage in that the latches do not have to be opened prior to attaching the implement, because the implement pins can force the latches open as they enter the hooks. However, this style does not provide a positive lock on the latch to prevent it from being rotated to the open position as it relies on the force of the spring to counteract any outside forces on the latch.

Another known production John Deere coupler has a straight latch and a 2-part column. The latch pivots at one end and the column is attached to a mid point of the latch. The linkage is attached to a center pin joint area of the 2-part column. When the latch is closed, the column members are in an over-center position and act as a solid member to resist compressive loads, thus locking the latch closed. When the handle pulls the linkage upward, the linkage buckles the column, pulling the latch open. This design provided a positive lock to hold the latch closed, however, the latches had to be manually opened using the handles prior to attaching an implement. If the implement pins struck the latches in the closed position, damage could result to the parts.

In another known production John Deere coupler includes a similar column. In this design, one member of the column was roughly L-shaped and extended through the latch to provide a "trigger". This trigger allows the implement to be attached without manually opening the latches. The implement pins contact the trigger before they contact the latches themselves. As the pins push into the coupler, the trigger buckles the column and allows the latch to move to the open position. This design combined a locking feature with the ability to attach the implement to the coupler without first opening the latches. However, the column required many components and became somewhat complex.

SUMMARY

Accordingly, an object of this invention is to provide a quick coupler latch which has both a locking feature and the ability to attach an implement without the latches being manually opened.

A further object of the invention is to provide such a quick coupler latch which is simple and has few components, thus reducing cost and assembly difficulty.

These and other objects are achieved by the present invention, wherein a quick coupler has a frame with a hook, and an operator movable control bar supported by the frame. The hook has a hook recess therein for receiving a hitch pin. A latch mechanism includes a latch, a one-piece trigger, a spring, a stop fixed to the coupler frame, and a control bar. The latch is pivotally supported by the frame and is movable to an open position permitting the hitch pin to move into and out of the hook recess, and is movable to a closed position preventing removal of the hitch pin from the hook recess. The trigger is pivotally coupled only to the latch and to the control bar, and extends through a slot formed in the latch. The trigger is engagable with the hitch pin and operable to move the latch to the open position in response to movement of the hitch pin towards the recess. When the hitch pin is received by the hook recess, the stop engages the trigger to prevent the trigger from allowing the latch to move to its open position. An upper end of the latch is pivotally coupled to the coupler frame, and a central portion of the trigger is pivotally coupled to a central portion of the latch. A shoulder surface is formed in a lower end of the latch, and a tab projects from an end of the trigger. The tab is engagable with the shoulder surface to limit pivoting of the latch to its open position when the trigger is in engagement with the stop. A latch spring is mounted on the latch and engages the frame and biased to urge the latch to its closed position.

BRIEF DESCRIPTION OF THE DRAWINGS

FIG. 3 is a perspective view of the latch of FIG. 1;

FIG. 4 is another perspective view of the latch of FIG. 1;

FIG. 5 is a perspective view of the trigger of FIG. 1;

FIG. 6 is a perspective view of the spring of FIG. 1;

DETAILED DESCRIPTION

Figure 1:
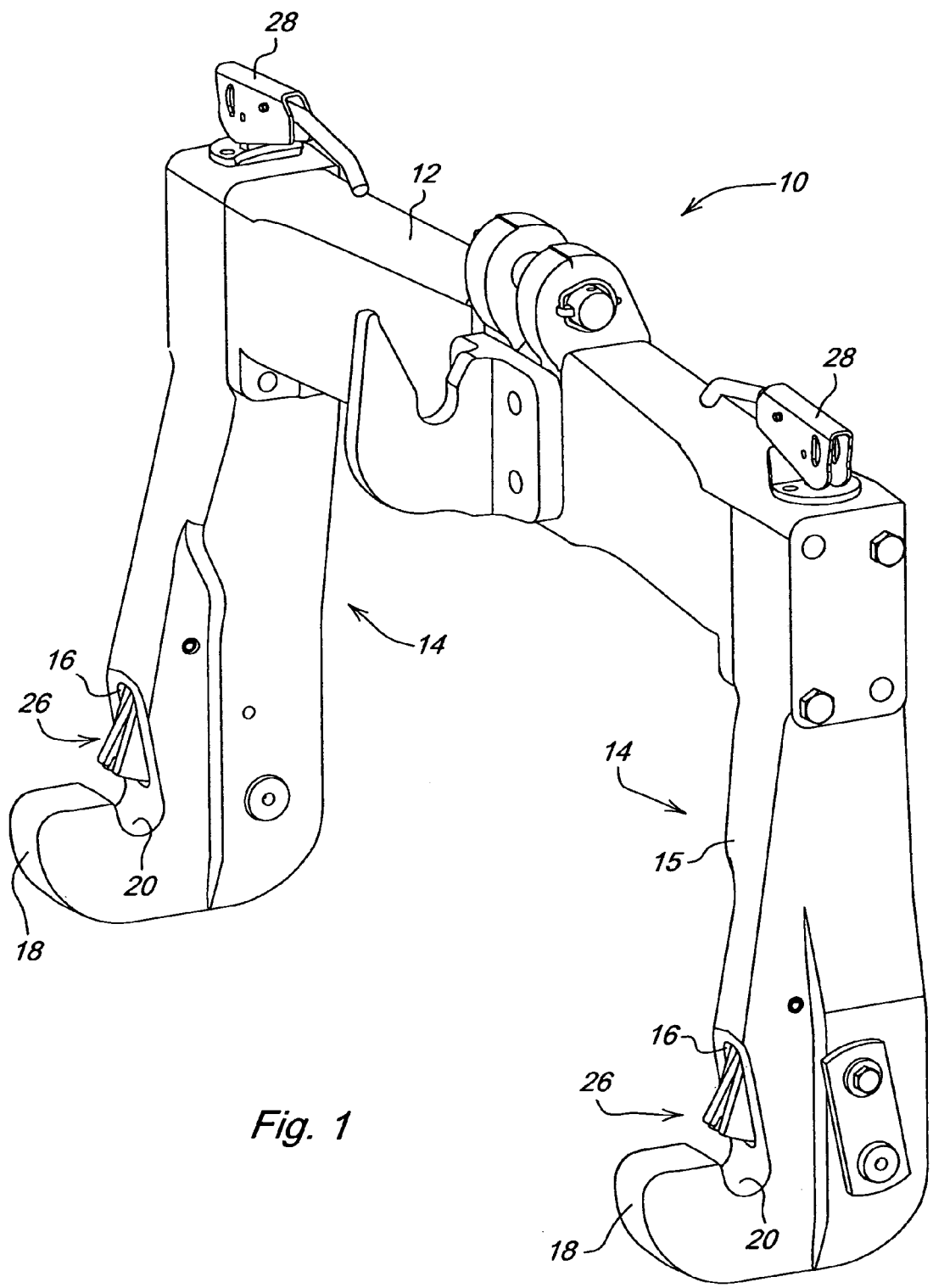
FIG. 1 is a perspective view of a quick coupler embodying the invention.

Referring to FIG. 1, a quick coupler 10 includes an inverted, generally U-shaped frame which has a transverse bight portion 12 and a pair of depending hollow legs 14. The legs 14 depend from the outer ends of bight 12 and are formed integrally therewith. The lower portions of legs 14 have rearwardly extending hooks 18, each of which forms an upwardly opening recess 20 which is adapted to receive the lower hitch pins 22 (shown in FIG. 2) of an associated implement (not shown). The hitch pins 22 are releasably held in the hook recesses 20 by the applicants' latching mechanism 26, operated by a known lever mechanism 28 positioned at the top of legs 14. A portion of the latching mechanism 26 projects outwardly through a latch aperture 16 in a rear wall 15 of the leg 14.

Figure 2:
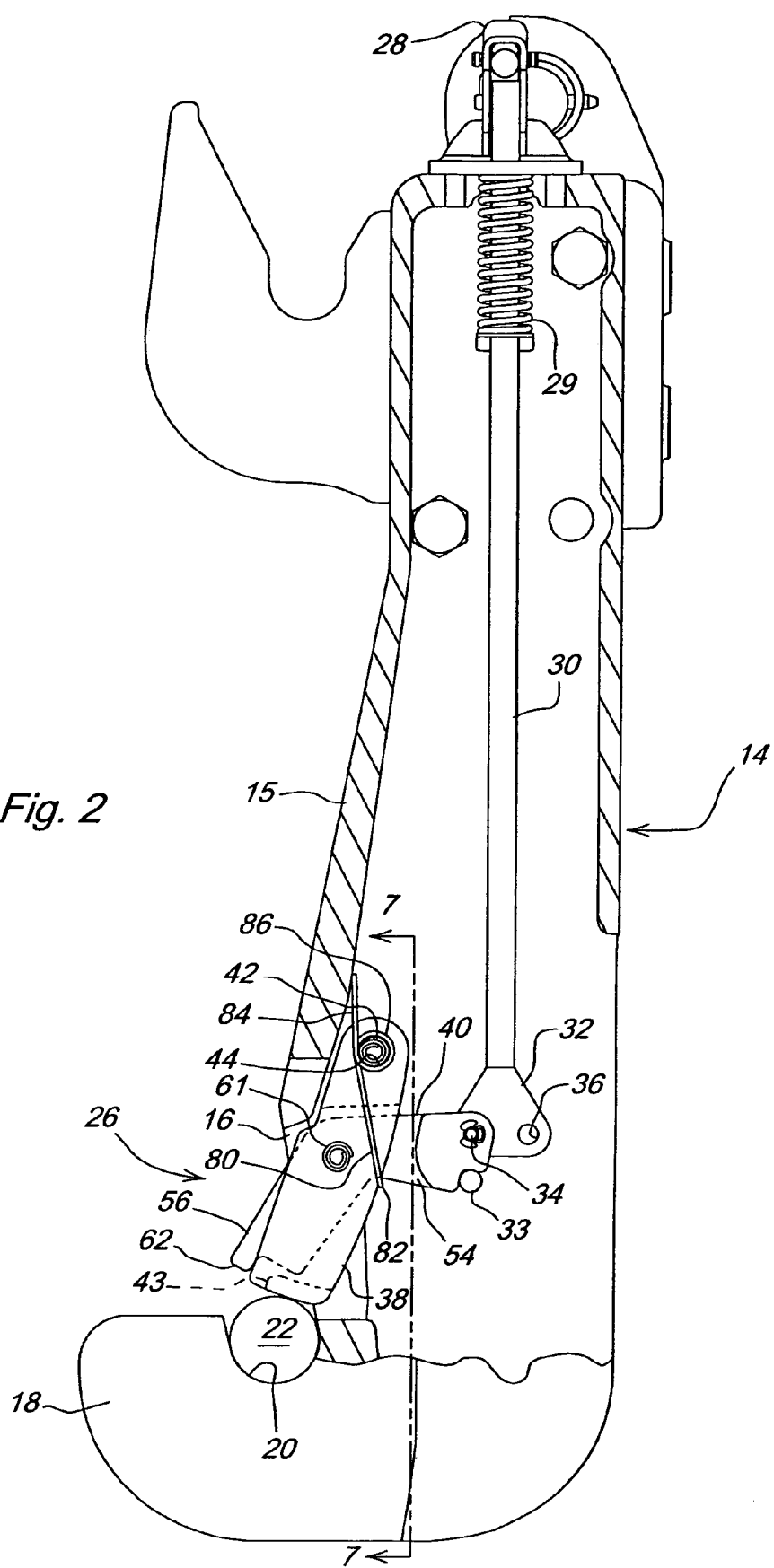
FIG. 2 is a sectional view of a left leg of the quick coupler of FIG. 1.

As best seen in FIG. 2, the latching mechanism 26 includes a control bar 30 with an upper end coupled to the known lever mechanism 28. Control bar 30 is urged downwardly by spring 29. The lower end of the bar 30 includes a coupling member 32 through which extend a pair of coupling bores 34 and 36. The latching mechanism 26 also includes a latch 38 and a trigger 40. A stop pin 33 is mounted in a bore in the legs 14, spaced apart from and below coupling member 32.

The upper end of latch 38 is pivotally coupled to the leg 16 by a latch pivot pin 42 which extends laterally and horizontally through a pivot bore 44 in the upper end of latch 38. A trigger pivot bore 46 extends though a central portion of latch 38. Wall 15 is engagable with the latch 38 to prevent the latch from pivoting clockwise from the closed position shown in FIG. 2. As best seen in FIGS. 3 and 4, the latch 38 includes a pair of spaced-apart side walls 48 and 50 which form a slot 52 therebetween. The lower end of latch 38 forms a wall 41 which extends part way between the side walls 48 and 50 and which forms a generally rearwardly facing shoulder 43.

Referring now to FIGS. 2 and 5, the trigger 40 has a generally L-shaped structure with a first arm 54 and a second arm 56 projecting away from a central portion 58. A pivot bore 60 extends through central portion 58 and receives a pivot pin 61. The lower end of arm 56 forms a tab 62. The outer end of arm 54 forms a pair of spaced-apart legs 64 and 66 which are separated by a slot 68. A pivot pin bore 70 extends through legs 64 and 66. A stop recess or notch 72 is formed in a corner of legs 64 and 66.

Figure 7:
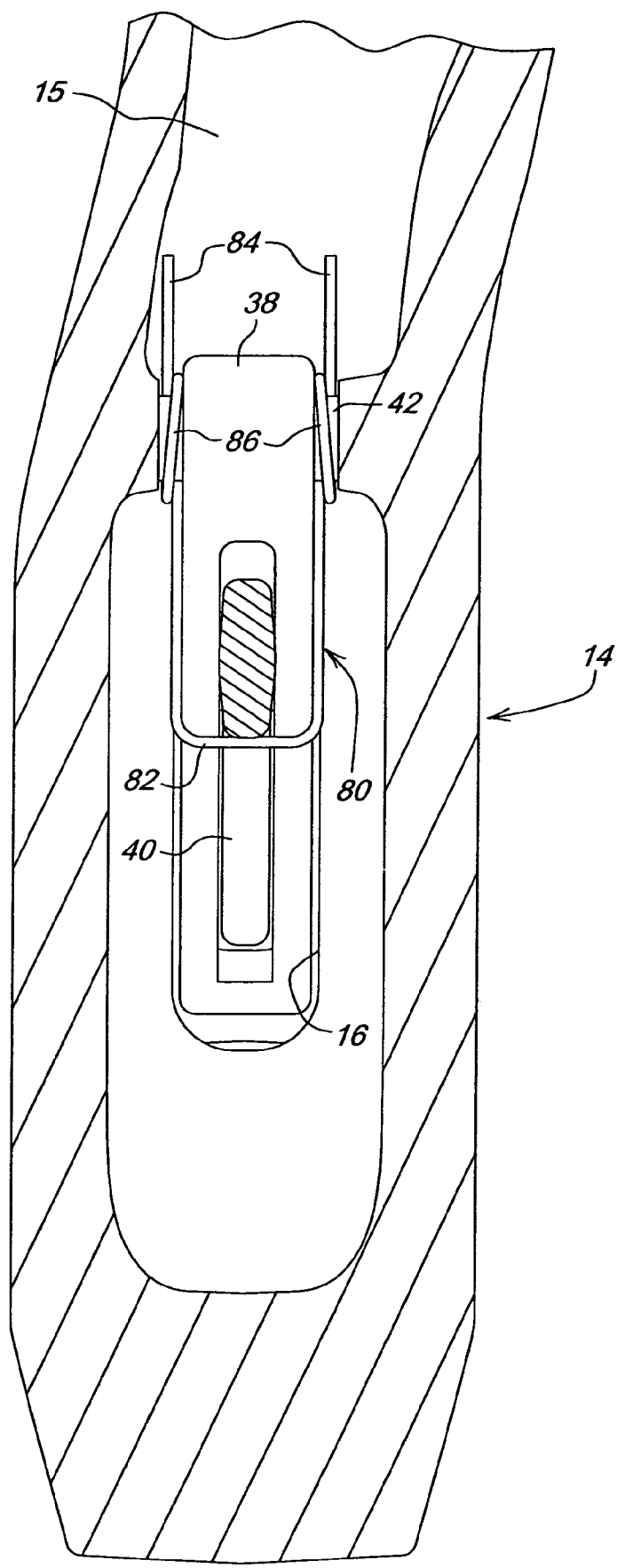
FIG. 7 is a sectional view in the direction of lines 7-7 of FIG. 2.

As best seen in FIGS. 2, 6 and 7, a latch spring 80 is mounted over latch 38. Spring 80 includes a transverse bight portion 82 and a pair of arms 84. Latch 38 is received between arms 84. Each arm 84 forms a coil or loop 86 which receives a corresponding end of pivot pin 42. The bight portion 82 engages and extends across a front side of the latch 38. The upper end of arms 84 engage an inner surface of rear wall 15 of leg 14. As a result, spring 80 is coupled to latch 38 and is biased to urge latch 38 clockwise, viewing FIG. 2, and thus, urges the lower end of latch 38 outwardly through opening 16 to its latched position shown in FIG. 2.

As best seen in FIG. 2, the latch 38 is pivotally coupled to a wall of the leg 14 by pin 42. The trigger 40 extends through the slot 52 in latch 38 and is pivotally coupled to latch 38 by pin 61. Trigger 40 is also pivotally coupled to coupling member 32 by a pin 35 received by bores 70 and 34. The surface of trigger notch 72 engages stop pin 33. When stop pin 33 engages notch 72, the arm 54 and pin 61 prevent latch 38 from pivoting counter-clockwise about pin 42 out of its latched or closed position to its open position. As a result, in the latched or closed position shown in FIG. 2, the hitch pin 22 is held within the hook recess 20 by latch 38.

If it is desired to remove the hitch pin 22 from the hook recess 20, the operator must use the lever 28 to raise control bar 30 and coupler 32. This pivots trigger 40 counter-clockwise, moves trigger 40 out of engagement with stop pin 33. Further raising of coupler 32 causes tab 62 of trigger 40 to engage wall 43 of latch 38, and thus further pivots latch 38 counter-clockwise about pivot pin 42 to its open position wherein the hitch pin 22 can be removed upwardly and out of hook recess 20.

Figure 8:
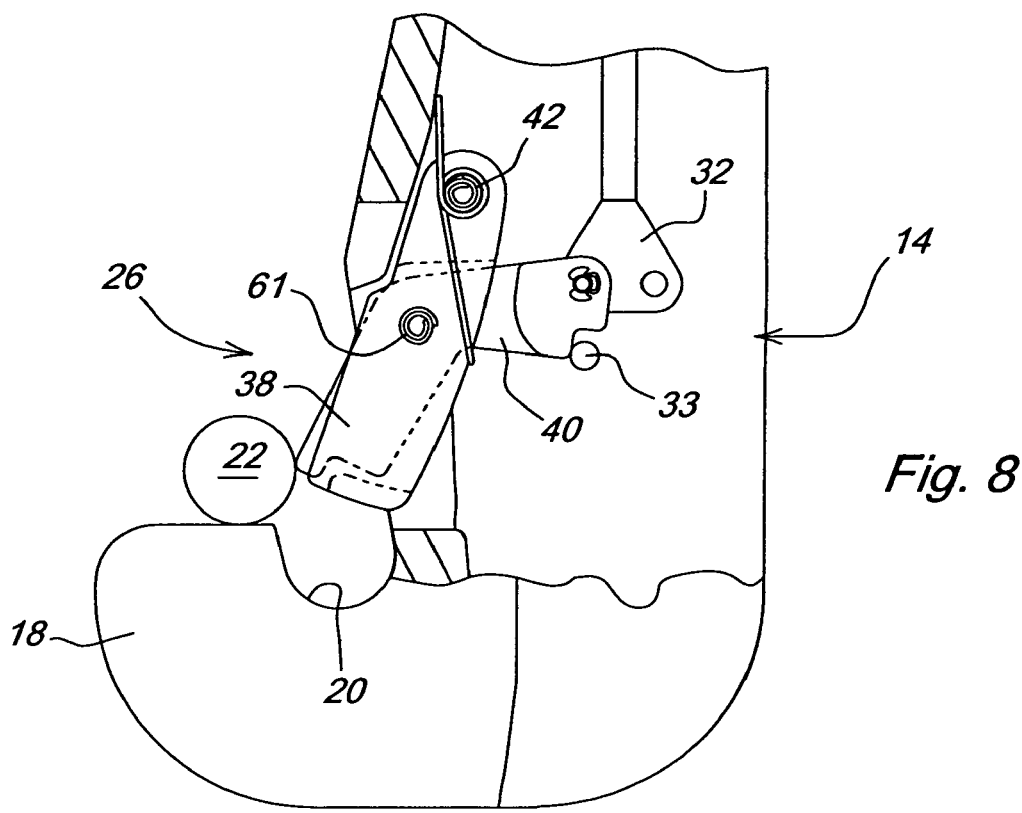
FIGS. 8-10 are side views showing the present invention in the process of receiving a hitch pin.
Figure 9:
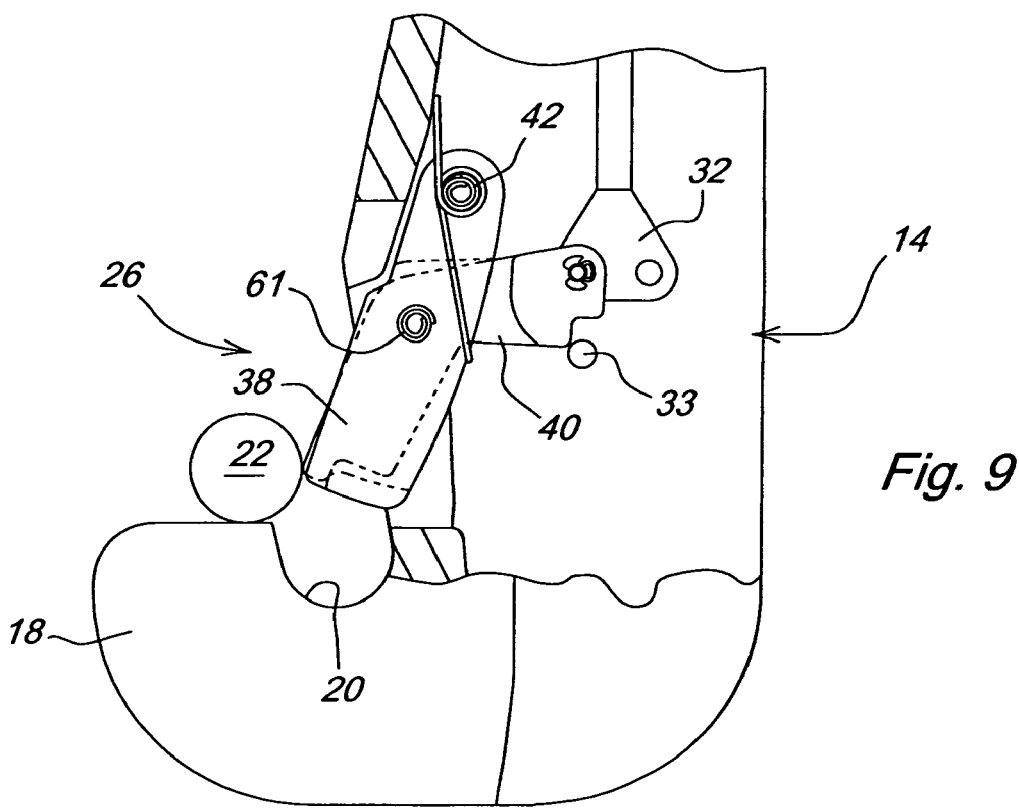
Figure 10:
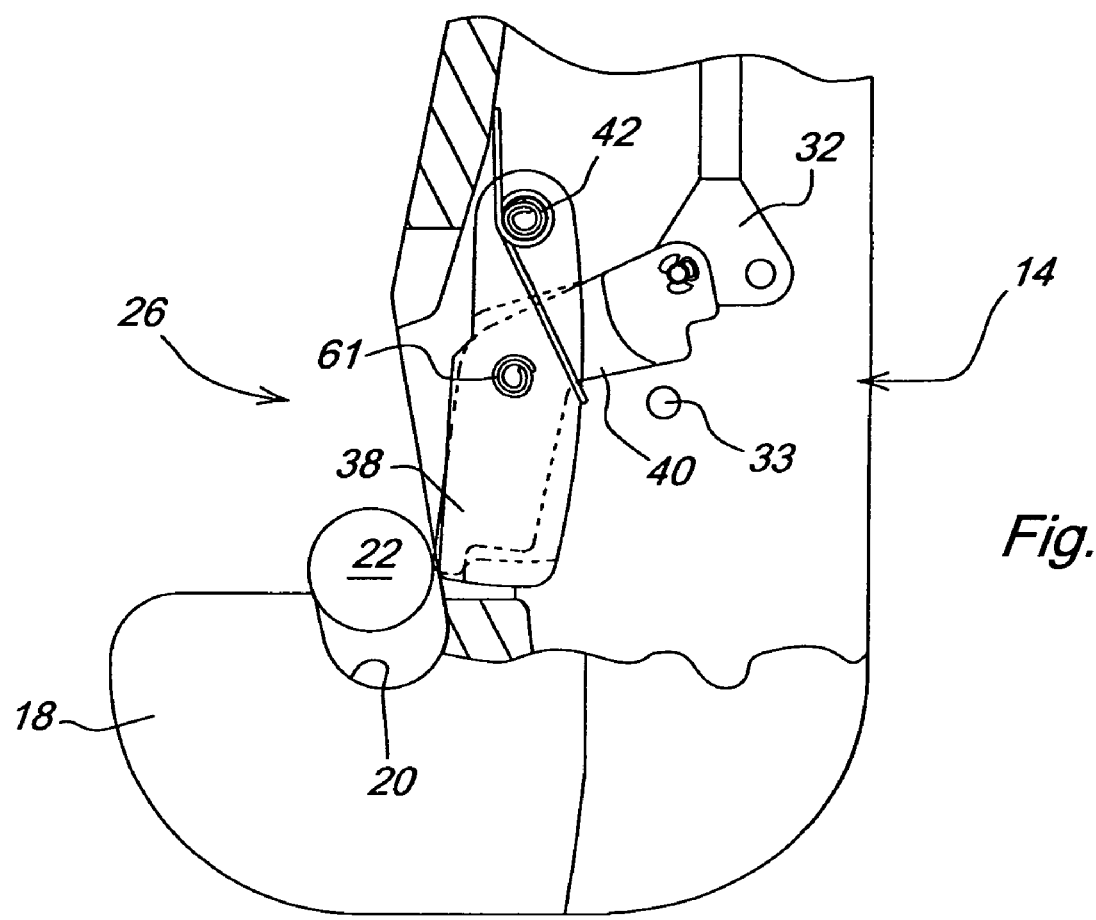

As best seen in FIGS. 8-10, if no hitch pin 22 is mounted in the hook recess 20, and the hitch pin 22 is moved towards the hook recess 20, the hitch pin 22 will first engage arm 56 or tab 62 of trigger 40. This pivots the trigger counter-clockwise about pin 61 and moves notch 72 out of engagement with stop pin 33 while the end of trigger arm 54 moves the control bar 30 upwardly against the bias of spring 29. The hitch pin 22 will then pivot latch 38 counter-clockwise about pin 42 to its open position wherein hitch pin 22 may be moved into the hook recess 20.

As a result, the above quick coupler latch has both a locking capability and the ability to attach an implement without the latches being manually opened.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. In a quick coupler having a frame with a hook, and an operator movable control bar supported by the frame, the hook having a hook recess therein for receiving a hitch pin, a latch mechanism comprising:

a latch pivotally supported by the frame and movable to an open position permitting the hitch pin to move into and out of the hook recess, and movable to a closed position preventing removal of the hitch pin from the hook recess, the latch having a shoulder surface formed in a lower end thereof;

a stop fixed to the coupler frame; and a one-piece trigger pivotally coupled only to the latch and to the control bar, the trigger being engagable with the hitch pin and operable to move the latch to the open position in response to movement of the hitch pin towards the recess, and when the hitch pin is received by the hook recess, the stop engaging the trigger to prevent the trigger from allowing the latch to move to its open position, the trigger having a tab which projects from an end thereof, the tab being engagable with the shoulder surface to limit pivoting of the latch to its open position when the trigger is in engagement with the stop.

2. In a quick coupler having a frame with a hook, and an operator movable control bar supported by the frame, the hook having a hook recess therein for receiving a hitch pin, a latch mechanism comprising:

a latch pivotally supported by the frame and movable to an open position permitting the hitch pin to move into and out of the hook recess, and movable to a closed position preventing removal of the hitch pin from the hook recess, the latch having a shoulder surface formed in a lower end thereof;

a stop fixed to the coupler frame; and a trigger pivotally coupled only to the latch and to the control bar, the trigger being engagable with the hitch pin and operable to move the latch to the open position in response to movement of the hitch pin towards the recess, and when the hitch pin is received by the hook recess, the stop engaging the trigger to prevent the trigger from allowing the latch to move to its open position, the trigger having a tab which projects from an end thereof, the tab being engagable with the shoulder surface to limit pivoting of the latch to its open position when the trigger is in engagement with the stop.

* * * * *